US010229268B2

(12) United States Patent
Momot (10) Patent No.: US 10,229,268 B2
(45) Date of Patent: Mar. 12, 2019

(54) SYSTEM AND METHOD FOR EMULATION-BASED DETECTION OF MALICIOUS CODE WITH UNMET OPERATING SYSTEM OR ARCHITECTURE DEPENDENCIES

(71) Applicant: Leviathan, Inc., Seattle, WA (US)

(72) Inventor: Falcon Momot, Seattle, WA (US)

(73) Assignee: LEVIATHAN, INC., Seattle, WA (US)

(*) Notice: Subject to any disclaimer, the term of this patent is extended or adjusted under 35 U.S.C. 154(b) by 186 days.

(21) Appl. No.: 15/082,970

(22) Filed: Mar. 28, 2016

(65) Prior Publication Data

US 2016/0283716 A1    Sep. 29, 2016

Related U.S. Application Data

(60) Provisional application No. 62/139,682, filed on Mar. 28, 2015.

(51) Int. Cl.
*G06F 21/56* (2013.01)
*G06F 21/53* (2013.01)
*G06F 9/455* (2018.01)

(52) U.S. Cl.
CPC ........ *G06F 21/566* (2013.01); *G06F 9/45558* (2013.01); *G06F 21/53* (2013.01); *G06F 21/56* (2013.01); *G06F 2009/45587* (2013.01); *G06F 2221/033* (2013.01)

(58) Field of Classification Search
CPC ........ G06F 21/566; G06F 21/56; G06F 21/53; G06F 9/30149; G06F 2221/033
See application file for complete search history.

(56) References Cited

U.S. PATENT DOCUMENTS

| 7,664,626 | B1* | 2/2010 | Ferrie | G06F 9/455 |
| | | | | 703/23 |
| 8,782,792 | B1* | 7/2014 | Bodke | G06F 21/53 |
| | | | | 713/187 |
| 9,652,613 | B1* | 5/2017 | Marsden | G06F 21/56 |
| 2013/0247198 | A1* | 9/2013 | Muttik | G06F 21/566 |
| | | | | 726/24 |
| 2014/0215617 | A1* | 7/2014 | Smith | H04L 63/1441 |
| | | | | 726/23 |
| 2017/0039369 | A1* | 2/2017 | Langton | G06F 21/566 |
| 2017/0091457 | A1* | 3/2017 | Zakorzhevsky | G06F 21/566 |

* cited by examiner

*Primary Examiner* — Theodore C Parsons
(74) *Attorney, Agent, or Firm* — Vernon W. Francissen (57) ABSTRACT

System, method and media are shown for detecting potentially malicious code by iteratively emulating potentially malicious code, that involve, for each offset of a memory image, emulating execution of an instruction at the offset on a first platform and, if execution fails, determining whether the instruction at the offset has relevance to at least a second platform and, if so, emulating execution of the instruction at the offset on the second platform. If execution succeeds, it involves checking the behavior of the executing code for suspect behavior, and identifying the executing code as malicious code if suspect behavior is detected. Refinements involve applying this process to also determine aspects of information related to the target of any discovered code, malicious or otherwise.

19 Claims, 8 Drawing Sheets

SYSTEM AND METHOD FOR EMULATION-BASED DETECTION OF MALICIOUS CODE WITH UNMET OPERATING SYSTEM OR ARCHITECTURE DEPENDENCIES

CROSS-REFERENCE TO RELATED APPLICATIONS

This application claims the benefit of U.S. Provisional Patent Appl. No. 62/139,682 for "System and Method for" Emulation-based Detection of Malicious Code with Unmet Operating System or Architecture Dependencies" filed Mar. 28, 2015, herein incorporated by reference in its entirety for all purposes The present application is also related to commonly owned, U.S. Provisional Patent Application Nos. 62/016,166, 62/028,173 and 62/025,120, which are incorporated by reference herein in their entirety for all purposes.

BACKGROUND

Computer networks and the devices and services that reside on them are often the subject of attacks by parties that are attempting to improperly access information and resources or to introduce malicious code to the networks. Exploit code is frequently injected into processes running on platforms for which the exploit code was not designed. Operating system and platform dependencies are introduced either intentionally (to improve targeting or avoid detection), by necessity (to take advantage of platform-specific features or vulnerabilities), or accidentally. Attackers do not always have the ability or inclination to prevent exploit code from attempting to run on platforms where it will be nonfunctional.

SUMMARY

According to one aspect of the present invention, examples of methods, systems and persistent media are shown for detecting potentially malicious code by iteratively emulating potentially malicious code for multiple platform profiles involves, for each offset of a memory image, emulating execution of an instruction stream at the offset on a first platform. It then involves, for at least one instruction in the instruction stream, determining whether the instruction at the offset has relevance to at least a second platform and, if so, emulating execution of at least one instruction at its respective starting offset on the second platform on which it may be relevant. If execution succeeds, the method involves checking the behavior of the executing code for suspect behavior and identifying the executing code as malicious code if suspect behavior is detected.

A further refinement involves applying the method fully only to an original pass, such that second or further passes are evaluated as to executability and malice but do not themselves generate additional or new passes, whether or not instructions which have relevance to other platforms are encountered. Relevance is defined as behavior of interest in malicious code detection, or behavior which varies according to platform.

In another refinement, at least some of the suspect behavior is defined by at least one of dynamically, parametrically, and statically. Yet another refinement involves monitoring at least one of optional features, predicates, and dependencies exercised during emulation and matching the exercised optional features, predicates, and dependencies against platform profiles to identify likely target platforms for a payload in the memory image.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
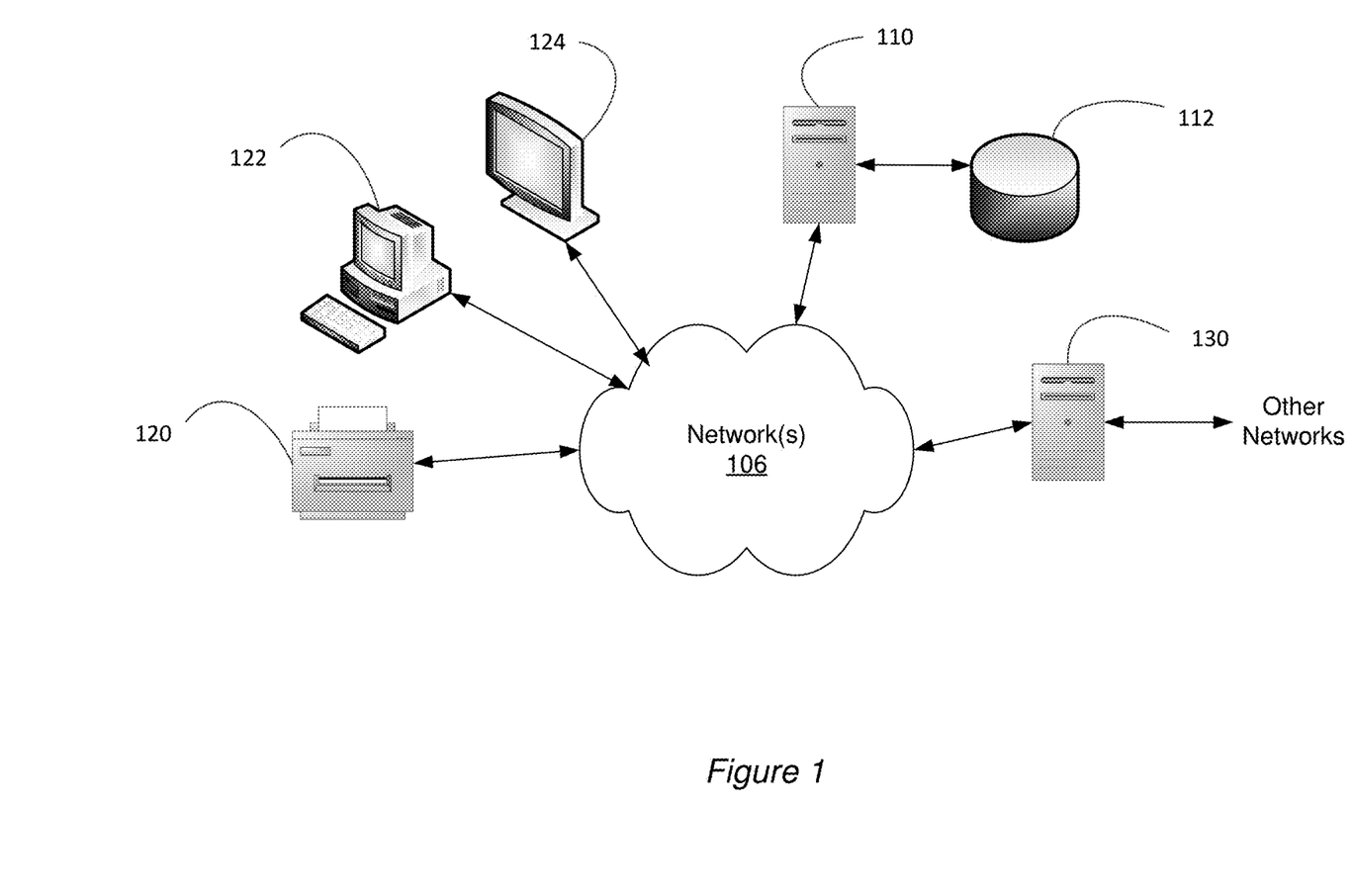
FIG. 1 is a schematic diagram depicting an example of a computer network based system that may be subject to attack and may be suitable for utilization of certain aspects of the present invention.

FIG. 1 is an architecture diagram that depicts aspects of an example of a computer network system with communication among multiple devices. In this example, network 106, which can be one network or multiple networks, provides communication between server 110 connected to database 112 and several client devices, such as printer 120, personal computer 122, and interactive terminal 124. The architecture of FIG. 1 is a simplified representation of an enterprise environment having a multitude of different computing devices that may represent a target for an attack. A gateway 130 provides a communications link between the network 106 and other networks, such as the internet, through which an attacker may launch an attack.

Many instruction set architectures, including x86, have variable-length instructions. The function of an instruction in a variable-length instruction set depends to varying degrees on an entire instruction. The function of an instruction can be significantly changed by removing one or more bytes from the beginning of the instruction. This is particularly true in cases where an instruction contains a mandatory prefix byte that is an escape byte or in cases where a prefix is used to modify the length of a parameter to the instruction, among others. It is also likely that changing the initial offset will change the function of subsequent instructions because each subsequent instruction begins immediately following the last byte of the preceding one.

It is occasionally possible for an attacker to branch execution to offsets in the middle of an instruction, resulting in modified behavior. This may serve at least one of two functions: obfuscation of the function of an attack payload, and the ability to transform the function of existing bytecode. Legitimate programs typically follow their own block-graph and rarely split instructions. An example of an exception is LOCK prefix splitting in x86 architectures; such cases are nearly always of the prefix-splitting form and are typically enumerable given instruction set architecture documentation. Instruction splitting is, therefore, a strong indicator of malicious code execution once legitimate cases are accounted for. The correct alignment of an instruction can be determined by parsing the section of bytecode in which it falls, starting from a known-good offset. Exported code or function symbols and a program's entry point are examples of known-good offsets. Each offset immediately subsequent to the end of an instruction which started at a known-good offset can then also be deemed a known-good offset, because it begins the following instruction, unless that prior instruction is an unconditional branch or halt. Branches to offsets other than known-good offsets are not part of normal program operation and are highly likely to be the result of exploitation of software vulnerabilities provided that the unaligned offsets do, in fact, produce a series of executable instructions with a different function.

Additionally, because the instructions in most microarchitectures are considerably more basic than the logical components of a programmer's intentions, merely removing the initial part of a programmer's function and rearranging the order of execution without splitting instructions (or in a fixed-instruction-width microarchitecture), by for example branching into the middle of a function from code not part of that function, is also able to substantially change the function of a program. Accordingly, for the purposes of detecting, for example, malicious branch-oriented programming (BOP) code, such as jump-oriented programming (JOP) or return-oriented programming (ROP), branches to offsets in code blocks that would not normally be branched to in the course of program execution, e.g. branches to the middle of a subroutine rather than an entry point or subroutine start, may be treated the same way as branches to the middle of instructions, i.e. instruction splitting.

Microcomputer code consists of an arbitrarily long stream of bytes. In many microcomputer architectures, such as x86, the stream controls its own semantics in-band. When combined with variable-length instructions as also exist in x86, the meaning of the stream is entirely different if the beginning of the first byte is offset by some number of bytes (this offset is termed alignment). Since each instruction modifies state that can modify the operation of subsequent instructions, it is important that the stream have the correct context. That is, if the stream is taken from arbitrary data on disk it is important that the beginning offset not only be faithful to the intended alignment, but index the instruction intended to begin the programmatic sequence.

Certain aspects of the present invention involve a method for dynamic code analysis that mitigates context dependencies by emulating a payload or a segment or segments of code from a payload from different offsets in order to detect the emergent functionality of misaligned microcomputer code. One example of a method for dynamic code analysis in accordance with certain aspects of the present invention involves iteratively emulating a corpus of data, such as a memory image, over multiple starting addresses using code offsets that are different from a normal code alignment and testing for functionality of the code, e.g. validity, executability or specific operations, as executed from the different code offsets. In other words, this approach involves iterating over several offsets in an instruction stream or data being evaluated as to whether it is an instruction stream that possibly exhibits certain behaviors to find an offset, aligned or otherwise, from which execution of the stream will produce certain specified behaviors. Emulation of the code in this manner may obviate the need for construction of an accurate control flow graph of the code stream in order to analyze the code. This approach may also be useful for identification of alternate meanings of an instruction stream at different alignments, as discovered through iteration over several alignments, or to analyze the nature of code that, possibly due to an error or inherent uncertainty in software vulnerability exploitation, is unreachable from the program being executed in a given memory image. Another aspect of certain embodiments is the computation of the set of addresses that are to be iteratively emulated with different offsets. The results or parameters of this computation may be shared across multiple nodes to permit distributed analysis.

Figure 2:
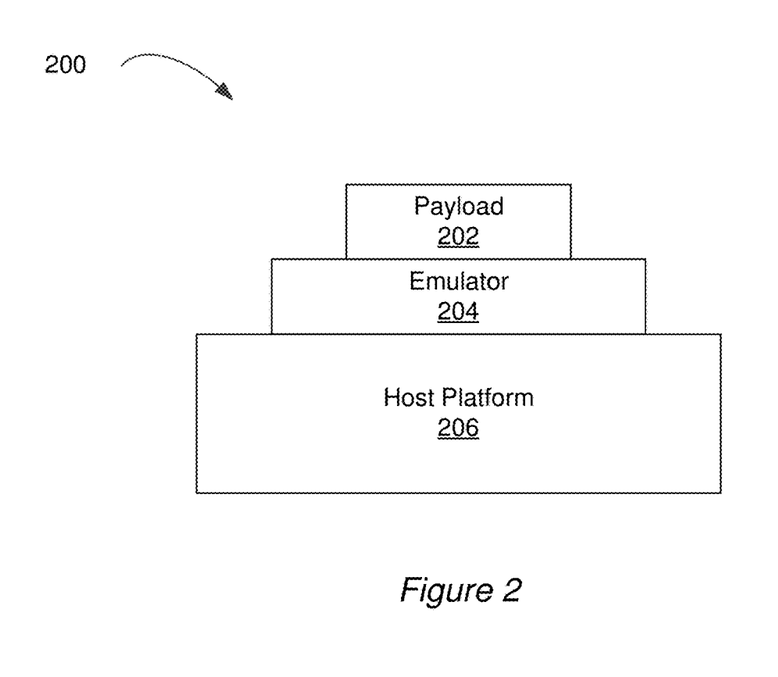
FIG. 2 is a functional block diagram illustrating a simplified example of the structure of conventional emulation.
Figure 3:
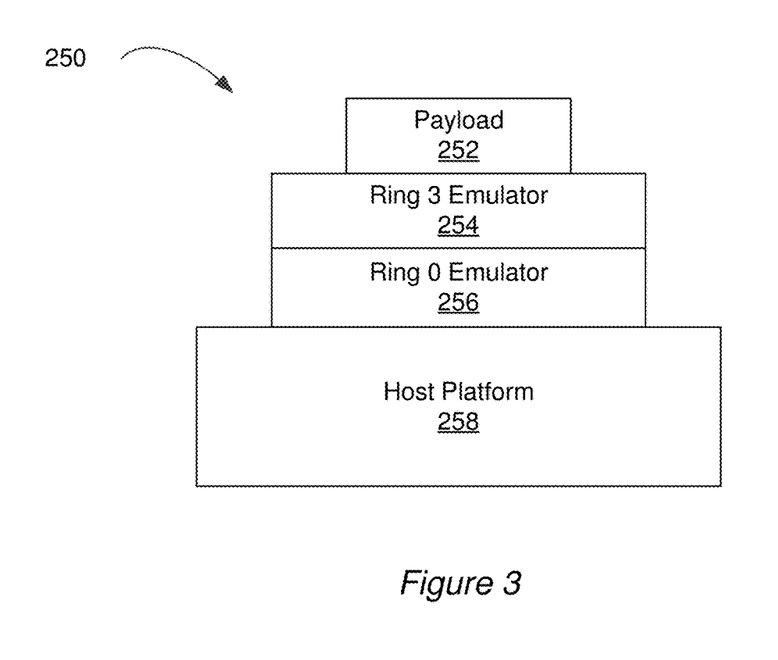
FIG. 3 is a functional block diagram illustrating a simplified example of the structure of emulation in accordance with certain aspects of the present invention.

FIG. 2 is a functional block diagram illustrating a simplified example of the structure of emulation, wherein an emulator program runs on a host platform and payload code runs on the emulator program, which emulates the payload functionality and relies on the host platform to provide basic functionality. For example, the emulator may provide Ring 3 emulation to the payload while Ring 0 responses are provided to the emulator from the host platform or a separate Ring 0 emulator rather than the host platform. FIG. 3 is a functional block diagram illustrating an example of separate Ring 3 and Ring 0 emulation. The payload interacts with the Ring 3 emulator as if it's a normal Ring 3 shell. Because Ring 0 functionality is separately emulated, the payload may be allowed to execute freely in order to observe its behavior without risk to the host platform and it is more difficult for the payload to detect that it's running in an emulated environment.

An emulator is software, hardware or a combination of both that emulates or imitates another program or device. For example, an emulator program may enable a host operating system, e.g. the Mac OS, to emulate another operating system, e.g. Windows, and thereby permit application programs written for emulated platform to execute on the host platform. The emulator duplicates the functions of the emulated platform on the host platform to present a virtual machine that exhibits the behavior of the emulated platform. To an application program, the virtual machine executing on the host platform appears as the emulated platform. The emulator allows the user to have access to any kind of application or operating system on a current platform, while the software runs as it did in its original environment. Many emulators emulate Ring 0 code to enable other programs, such as applications, to operate. Other emulators mimic a microarchitecture.

One example of emulation in accordance with certain aspects of the present invention is running executable code in a way that allows it to make use of operating system functionality to a limited extent without any operating system code being emulated in the same context as the code under emulation, based upon a directory of the behavior of the operating system under emulation, without effecting the intent of the operating system functionality. In essence, the code under emulation is unable to accomplish its intended purpose while still being able to execute, through the emulation of certain operating system and microarchitecture functionality in such a way that it returns the expected results to the code under emulation, but such that it does not actually perform the task it would be expected to perform outside the emulator.

In certain embodiments of a method for dynamic analysis in accordance with certain aspects of the present invention, the method involves emulating execution of a payload or segments of code in a payload from multiple code alignments (e.g. there are generally 4 possible alignments in fixed-instruction-width 32-bit systems and 8 in fixed-instruction-width 64-bit systems, and arbitrarily many in variable-instruction-width architectures) for sequences that appear to be functional.

However, an iterative emulation approach to malware detection may not detect exploit code that was intended for a different target architecture since it will appear nonfunctional to the emulator. An approach is described herein that provides an iterative emulator to generate additional detection work for different target profiles that may detect code with operating system or hardware dependencies that are different from an initial target profile.

Figure 4:
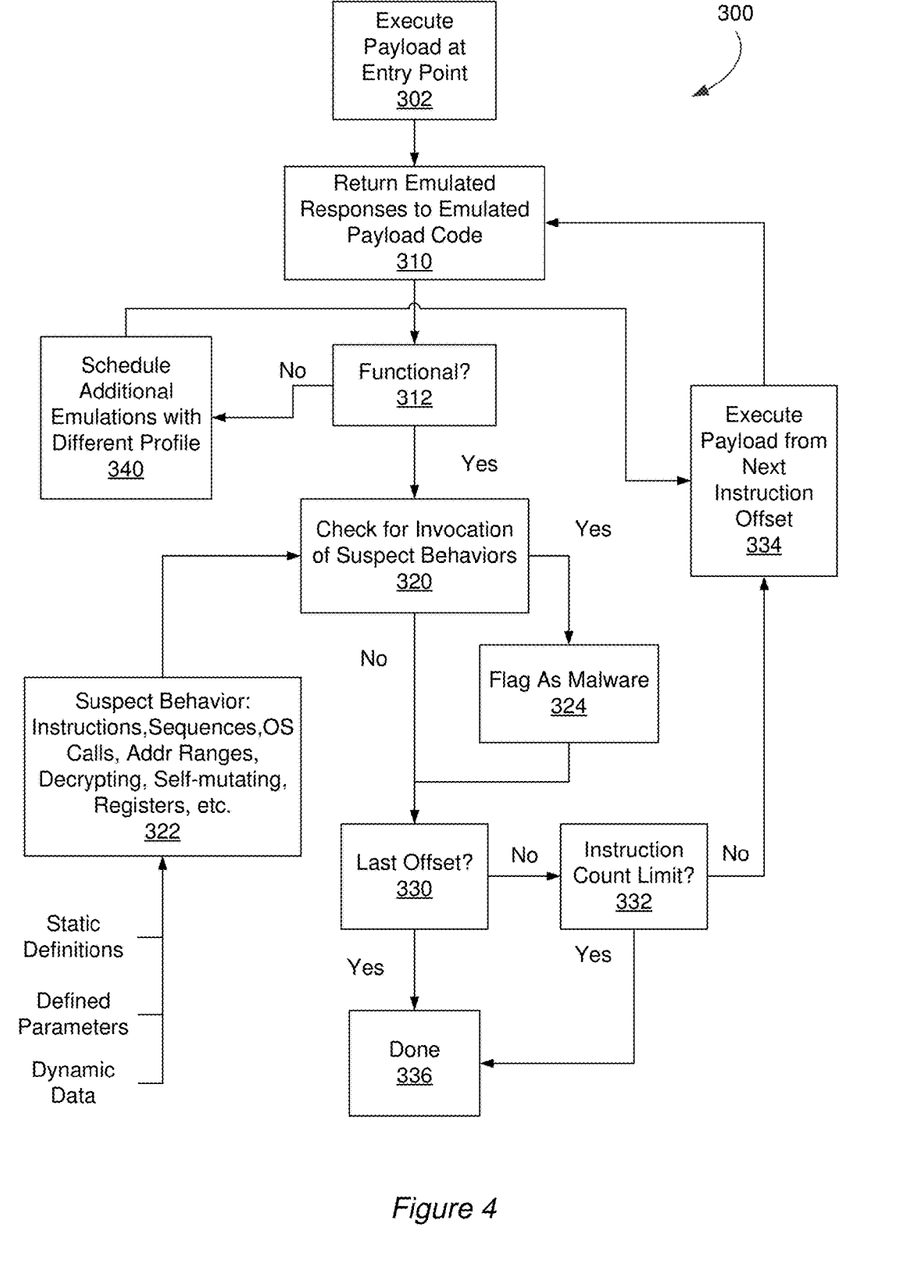
FIG. 4 is a control flow diagram illustrating an example of an emulation process in accordance with some aspects of the present invention.

FIG. 4 is a control flow diagram illustrating an example of a process 300 for iterative emulation of microcode for dynamic analysis in accordance with certain aspects of the present invention. In this example, emulated execution of a payload or portions of a payload is performed at different offsets or alignments. This example also provides for scheduling additional emulations for different system profiles when the code under analysis is non-functional for the initial system profile.

At step 302, the first instruction alignment is determined and the payload is executed by an emulator beginning at the entry point of the payload or a sequence of instructions with the payload. In one example, emulating the payload includes emulating the payload based on each possible instruction alignment on a fixed-instruction-length architecture corresponding to the code in the suspected payload. For example, if the architecture instruction length is 4 bytes, each of the instruction offset, the instruction offset plus one, the instruction offset plus two, and the instruction offset plus three would be used as starting offsets for each iteration of emulation of the payload. Similarly, if it is two bytes, the instruction offset and the instruction offset plus one will be used for starting offsets. If the architecture uses 24-bit (3 byte) instructions and 32-bit (4 byte) data words, the +0, +1, and +2 alignments would be used in emulation.

Another example involves emulating the contents of a memory image and includes emulating linear execution of an instruction stream deemed to begin at each address present in the memory image. For example, for a memory image containing 65536 committed bytes, 65536 invocations of an analytic emulator are run, one starting from each successive address, in order to find whether one or more such addresses begins a program that appears to the analytic emulator to exhibit malicious behavior.

The emulation may also be performed on fixed or sliding windows of addresses within the payload, of static or dynamic size, which reflects the characteristic of many malicious payloads, such as BOP exploits, to consist of small segments of functional code. The window size may, for example, be predetermined or adjusted and reflects the characteristic of malicious code to be small, e.g. the characteristic of JOP exploits that the jump table is usually small (i.e. the elements of the jump table forming the JOP program are co-proximal) and, similarly, that a ROP chain is relatively small and closely packed. Such a window may consider branch targets to be contiguous with their respective branch instructions for the purposes of dynamic analysis and instruction counting, and similarly consider at least some loops to be unrolled (that is, executed linearly), and thus applies to the sequence of instructions actually emulated, without regard to the layout of those instructions in emulated process memory.

One example of emulation in accordance with certain aspects of the present invention emulates both the microarchitecture and the Ring 3 code, while maintaining a separation between them. The emulator implements suitable Ring 0 code, e.g. returning appropriate behavior for the Ring 3 code under emulation, and separately emulates the Ring 3 code, providing for a microarchitecture or processor mode different from that on which the emulator is running, e.g. x86 IA-32e compatibility mode on an Intel 64 processor running in 64-bit mode. Because of this, the emulator is able to conduct dynamic analysis on the running code and report on its behavior as opposed to simply allowing the code under emulation to perform the purpose for which it was intended. Certain examples adapt the emulation process to analysis of crashes resulting from attempts to inject malicious payloads into software. Other examples adapt the emulation process to find malicious payloads in arbitrary data or apply instrumentation to an already isolated payload to permit the payload to be studied.

Another example in accordance with the present invention involves running the code from a variety of different offsets, for example, each address residing in a read/write page of memory, which is a page type that is more likely to contain malicious payloads than other page types. While few of these offsets would make an effective entry point for a program, and, in fact, none of them may be the canonical entry point, it is likely that if a malicious payload exists, one of the offsets will be its starting address, which will trigger execution of the malicious payload so that its behavior may be detected and analyzed. In essence, this example involves emulating parts of a process image that are likely to be useful to attackers, rather than those parts which are likely to be legitimate code, without reference to the entry points in the code for the process. In effect, this example combines an iterative linear search with an instruction limit to analyze a large number of offsets to detect which offsets are likely to be valid entry points for malicious code, of which there may be many in an exploit payload.

In another example in accordance with the present invention, emulation is started from a later offset than the program entry in order to bypass anti-emulator loops embedded in malicious payloads. In still another example, an instruction count limit is utilized in the emulator to ensure that analysis will, at some point, complete without a need to solve the halting problem. In yet another example, the emulated code includes either literal code or sequences of pointers to literal code that are emulated in such a way that control is transferred to code at each pointer either in succession or in some defined order (e.g. ROP chains or JOP tables).

Certain embodiments of the present invention are able to detect malicious payloads that were not successfully executed despite being successfully introduced into process memory. In order to exploit arbitrary code execution vulnerabilities in software, an attacker first introduces the payload into process memory, and then "hijacks" or takes control of the instruction pointer such that it points to the beginning of the payload. Introducing the payload is less likely to fail than taking control of the instruction pointer since many programs are designed to load arbitrary data into memory. The control step will fail for such reasons as the wrong offset being jumped to, or a protection against this operation which exists in the program being exploited. If this happens, the malicious payload is not reachable through the normal program block graph from the original execution entry point and certain embodiments of the present invention emulate from other offsets to find the payload.

An aspect of certain embodiments of the present invention involves executing arbitrary code in an emulator that detects and reports on certain behavior, such as malicious code-like activity, including the invocation of certain operating system behavior, the execution of certain instructions or sequences of instructions, and accesses to certain memory addresses, all of which may be defined dynamically, parametrically, or statically. In one example, the emulation keeps the code under emulation executing as long as reasonable from each offset, while implementing any self-contained functionality in the code, e.g. decrypting or self-mutating operations, without completely executing it. Instrumentation is then used to check for behavior that is valid yet unlikely to be found in legitimate code, such as sequences of instructions whose effect is to load the value of the instruction pointer into a general purpose register or to detect whether the code is running in an emulator.

One aspect of certain embodiments of the present invention is detecting the intended invocation of undefined processor behavior and reporting on its occurrence. Some embodiments of the present invention have properties similar to a signature-based malicious code detection engine, except that these embodiments are able to use a discrete set of signatures, which are lists of behaviors rather than of sequences, and remove the need to pre-compute the results of the malicious code's decoders. Rather, the decoder present in the malicious code is itself used, if one exists, so that it is not necessary to recognize them or keep an updated list. In other words, instead of trying to merely match malicious code sequences, certain embodiments detect that malicious actions were attempted directly. Certain components of the execution environment, such as userland parts of exception handling, can be executed in this way to also improve detection.

Because the malicious code is not running in a real environment, sandboxing may not be needed. System calls are emulated, but their effect on the system is not. Therefore the malicious code running within the emulator is unable to communicate with other systems or processes, and the malicious code cannot achieve persistence, unless there is a vulnerability in the emulator implementation that would allow control to be taken of the host system, which is the same risk as in any other application. The emulation of the present invention does not represent an elevated risk of compromise even though it concentrates malicious data.

Note that the malicious code is unlikely to be entirely executed. The method often merely infers that malicious code was injected into the process under analysis and that an attempt was made to branch execution in a suspicious way. The mechanisms of persistence of the exploit and the intention of the exploit are not necessarily analyzed. Generally, it is the techniques used in the initial part of the payload, which gains control of execution and starts the components that conduct malicious computation or achieve persistence, that are analyzed. However, once the presence and location of malicious code are confirmed through certain embodiments of the present invention, other tools may be used to analyze the exact end-to-end effects, possibly under direct manual control, and possibly without emulation.

As noted above, FIG. 4 is a control flow diagram illustrating an example of an emulation process 300 for in accordance with certain aspects of the present invention. Continuing with this example, at step 302, the payload code or a segment of the payload code is executed in a Ring 3 (e.g. user space) emulator starting at a normal entry point for the payload code. At step 310, calls to Ring 0 (e.g. kernel) functionality from Ring 3 cause the Ring 0 functionality to be emulated and the emulated response returned to Ring 3. In this manner, Ring 0 and Ring 3 functionality is emulated separately. This may involve emulating certain operating system and microarchitecture functionality in such a way that the Ring 0 emulation returns the expected results to the payload code or segment under emulation, but does not actually perform the task it would be expected to perform outside the emulator in the host platform. Emulation of events that are dependent upon unknown or unknowable circumstances, e.g. reads from disk or device drivers where context is unavailable or a capture of that context is unimplemented, may be simulated by providing random or static data, though at a cost to the accuracy and completeness of the emulation.

Figure 5:
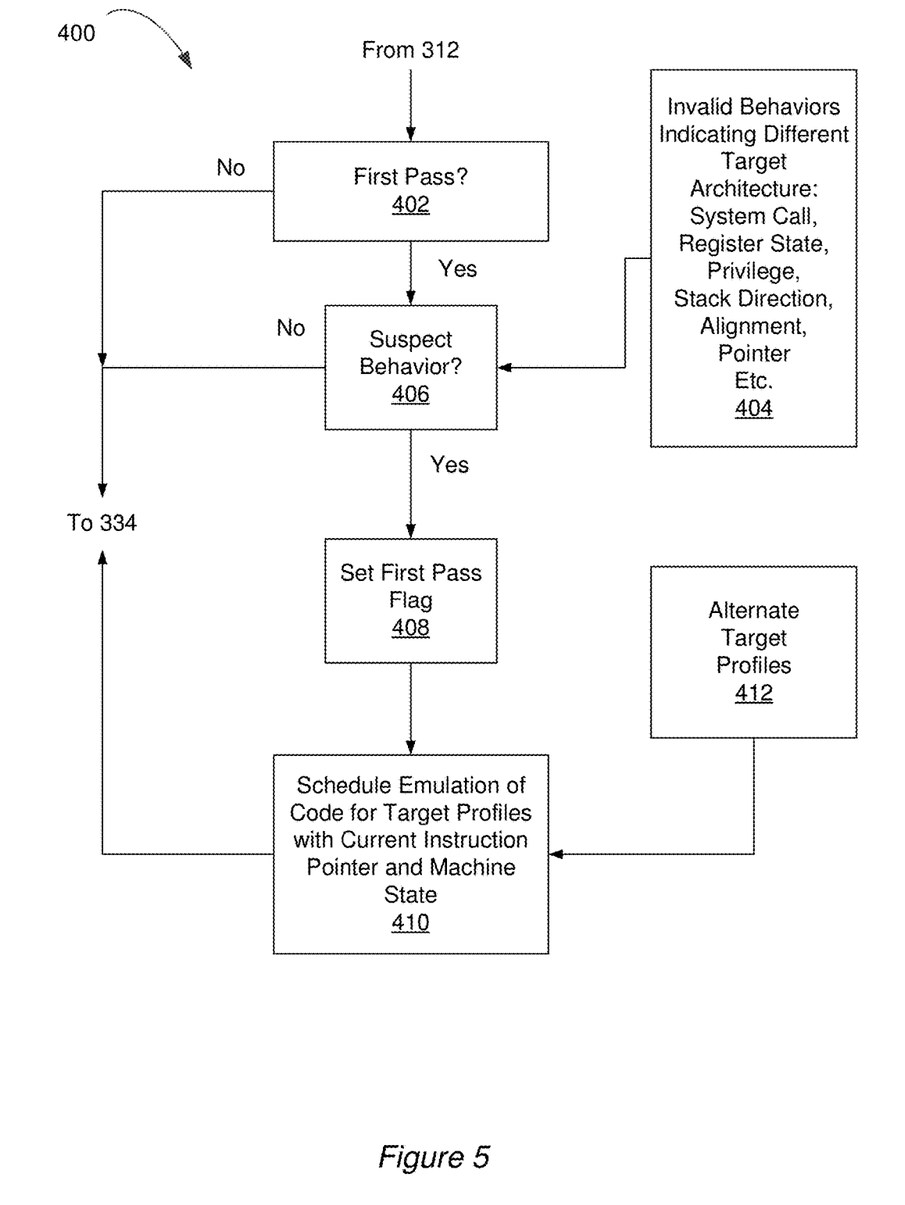
FIG. 5 is a control flow diagram illustrating another example of an emulation process in accordance with some aspects of the present invention.

At step 312, the emulated code is checked to determine whether it is functional, e.g. whether the code at the current offset is a valid instruction that is executable. For example, the current offset of the emulated code may result in an invalid instruction, in which case the code as emulated for the initial system profile at the current offset is non-functional. In this example, when non-functional code is encountered, control flow branches to step 340 for consideration and scheduling of additional emulations with one or more different profiles. One example of an implementation of step 340 is shown in FIG. 5. Once scheduling is initiated, control flow branches to step 334 for determination and execution of the payload or segment from the next instruction offset. If the code is executable, then control flows to step 320 to check the function of the code.

At step 320, the behavior of the payload code or segment as it is executed at the current offset in Ring 3 emulation is examined for suspect behavior associated with malicious code. The suspect behavior may be defined dynamically, parametrically, or statically by, for example, a detection engine at step 322. Suspect behavior includes, for example, invocation of certain operating system behavior, execution of certain instructions or sequences of instructions, and accesses to certain memory addresses, self-contained functionality in the code, e.g. decrypting or self-mutating operations, or sequences of instructions whose effect is to load the value of the instruction pointer into a general purpose register or to detect whether the code is running in an emulator. The detection engine may also use a discrete set of signatures, which are lists of behaviors rather than of sequences of bytes, and may be checked, for example, initially and when self-modifying code is found to mutate. Further, the engine may detect when the instruction pointer has moved into a range of addresses that is suspicious, such as ranges not normally executed in the vulnerable programs blockgraph. This range may be configured, precomputed, or a combination of configured and computed. The range of suspect addresses may include addresses that should never be executed, such as the program stack, and addresses that are known to be typically used in malicious code, e.g. 0x41414141. Other external heuristics may also be applied to determine the set of suspicious address ranges. The Suspect Behavior data of step 322 may include externally provided static definitions, defined parameters and dynamic data that are associated with potentially malicious code.

If suspect behavior is detected at step 320, then the code under test is flagged as potential malicious code at step 324. Step 324 may include providing data on the behavior of the executed malicious payload, such as address of the code, the type of behavior detected, and dynamically generated process data. In this embodiment, control branches to step 330 for further emulation. Alternative embodiments may terminate emulation once the malicious code is detected.

At step 330, a check is performed to determine whether additional instruction offsets exist that may be emulated and control flows to step 334 to execute the payload code from the next offset and branch to step 310 for continued emulation. In this example, the emulation process runs the payload code or a window or segment of code from a variety of different offsets without reference to the entry points in the code for the process, such as each address residing in a read/write page of memory to attempt to trigger execution of malicious code within the payload so that its behavior may be detected and analyzed. For example, a set of malicious code that is preceded by a branch instruction that branches past the malicious code may keep the malicious code hidden. Emulating from each address in read/write memory will eventually begin executing at the beginning of the malicious code, which will trigger execution of the code.

If no additional offsets are to be run, then emulation terminates at step 336. If there are additional offsets, but the number of executed instructions from the payload has reached an instruction count limit, then emulation also terminates in order to avoid the halting problem. Note that the process 300 may be applied to a segment of the payload code with all of the possible offsets being emulated for the segment. The process 300 may also be applied to a sliding window of payload code that checks for functional code at all of the possible offsets of instructions in a window that increments through the payload.

FIG. 5 is a control flow diagram illustrating one example of an emulation scheduling process 400 for additional system profiles in accordance with certain aspects of the present invention. Control branches from step 312 of process 300 of FIG. 4 to step 402 of FIG. 5, where a first pass flag is checked to determine if this is the first time that process 400 has been invoked for a segment of code. If this isn't the first pass for the code segment, then control branches back to step 334 without the scheduling of additional emulations. Only the first pass is permitted to schedule additional emulations in order to prevent the payload from causing a large number of profiles to be flagged. This situation may occur accidentally or may represent an attack on the emulation itself by a payload designed to overwhelm the emulation detection process.

If this is the first pass through the scheduling process for the code segment, then control branches to step 406 for consideration of whether the code represents behaviors that may indicate that a different system architecture is the target of the code. These behaviors include those that may be valid or have different functionality on other systems; specific examples may include invalid instructions, system calls, interrupts, register states or accesses, operations causing privilege violations, stack direction errors, alignment errors, or pointer accesses. Data regarding these sorts of behaviors may be stored at 404 and may include an indication of a profile corresponding to the system on which the code may be functional. If no possible differing alternate platform behavior is identified (e.g. an operation is trivially found to be invalid on all possible architectures and platforms under emulation), then control returns to step 334 in this example. Otherwise, control branches to step 408 to set the first pass flag that is checked at step 402.

Control continues to step 410, where an emulation, such as process 300 of FIG. 4, is scheduled for the code segment for each alternate target profile that may be relevant. For example, the relevant target profiles for the behaviors identified in step 404 may be identified in step 406 and an emulation pass scheduled for each of the profiles corresponding to suspicious behavior. Each emulation is scheduled for a particular target profile and is performed with the current instruction pointer and machine state of the emulation process invoking process 400. Once the additional emulations are scheduled, control returns to step 334 of process 300 to continue the original emulation pass. The result is that the additional emulations with different target profiles may detect exploit code in the memory image of a process that had been running on a system on which the exploit code failed by emulating the code on other potential target platforms.

Figure 6:
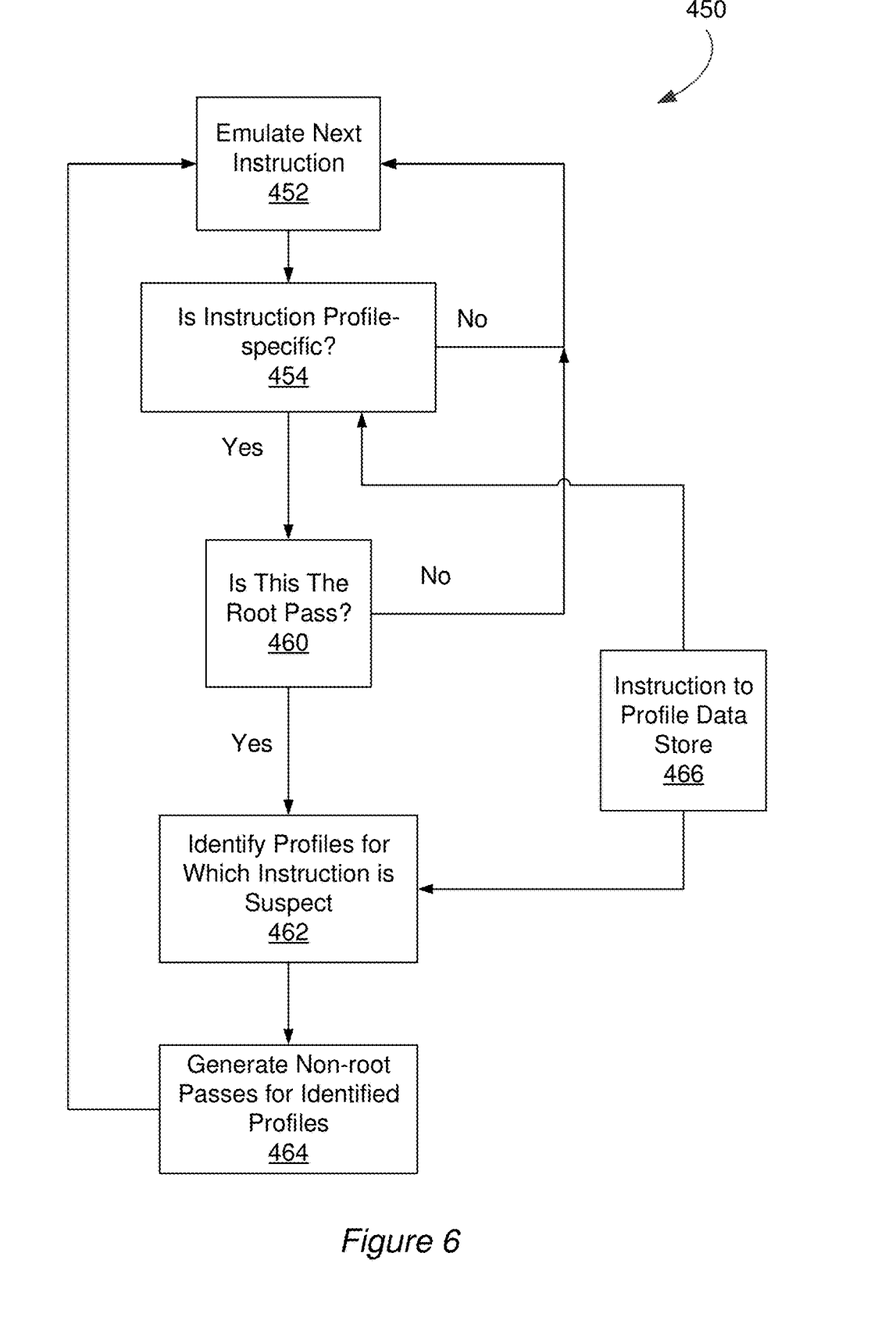
FIG. 6 is a control flow diagram illustrating another example of an emulation process in accordance with some aspects of the present invention.

Another simplified example of an approach to detecting malicious code through emulation is shown in process 450 of FIG. 6. In this example, each instruction of a memory image is emulated at step 452. At step 454, the instruction is checked to determine whether it is profile specific.

If the instruction is not profile specific, emulation proceeds to the next instruction at step 452. Otherwise, at step 460, a check is made to determine whether this is the first, e.g. root, pass for the instruction. If it is not the root pass, then no further emulations are scheduled and the process continues to the next instruction. Otherwise, at step 460, the profiles for which the current instruction is suspect are identified, for example, from instruction to profile data stored at 466. The data stored at 466 may, for example, be provided from external sources, developed internally from empirical data, or a combination of both. At step 464, a non-root pass through the emulation process is generated for each identified profile for the instruction.

For example, an instruction may be a system call, the functionality of which is decided by the emulator based on a lookup in the concerned OS profile. In one implementation, portions of functions 454 and 462 may be combined such that if the instruction lookup in profile data 466 indicates functionality for other profiles, then the emulation for the current profile proceeds, but a message is generated that contains the register state including the instruction pointer at the beginning of execution of the instruction concerned and the identity of a profile for which the instruction is to be emulated. The system responds to the message by enqueuing additional passes of the emulator starting with the given instruction pointer, machine state and the profile to be emulated.

Figure 7:
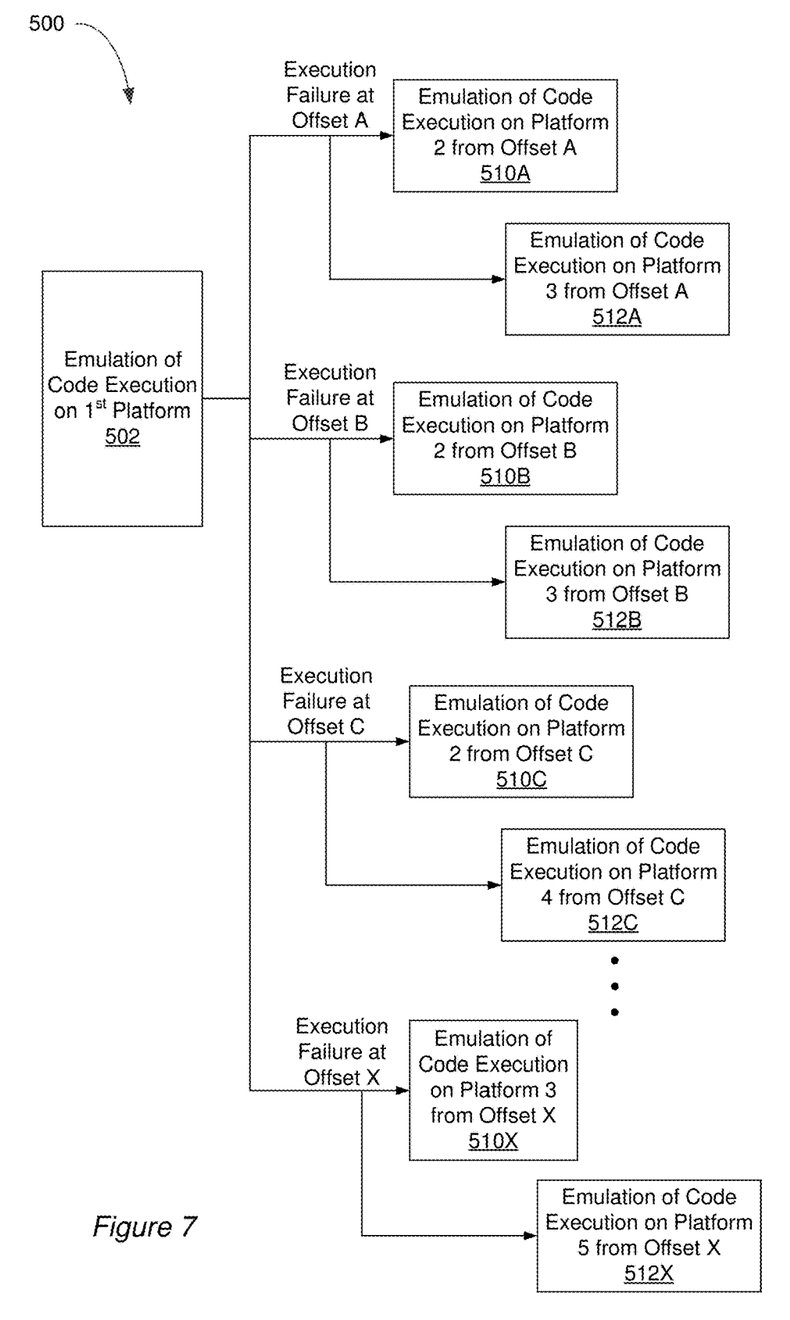
FIG. 7 is a block diagram illustrating one example of multiple emulations being scheduled for multiple platforms as a result of execution failures in emulation of code execution on a first platform.

FIG. 7 is a block diagram illustrating one example of multiple emulations scheduled for different platforms as a result of execution failures in emulation of code execution on a first platform, such as emulations scheduled at step 340 of process 300 of FIG. 4 as a result of instruction failures occurring at step 312. Instruction to Profile Data Store 462 in FIG. 6 includes data that identifies platforms that may be of concern for given instructions.

In this example, emulation of code execution on a first platform 502 results in execution failures, e.g. non-functional instructions, at several offsets. For a failure at Offset A, Platforms 2 and 3 are identified in Data Store 462 as platforms for additional consideration for the failure of the instruction at Offset A. Thus, at step 340, emulations 510A and 512A are scheduled for Platforms 2 and 3, respectively, for execution from Offset A. Similarly, execution failure at Offset B results in the scheduling of emulations 510B and 512B for execution from Offset B based on Platforms 2 and 3 being identified in Data Store 462 with respect to the instruction code at Offset B. For execution failure at Offset C, Data Store 462 identifies Platforms 2 and 4 as being relevant for the instruction code at Offset C and emulations 510C and 512C are scheduled for execution from Offset C For Platforms 2 and 4, respectively. The process continues based on data in Data Store 462 that identifies the instruction to profile relationship data. Finally, for execution failure at Offset X, Data Store 462 identifies Platforms 3 and 5 as being relevant for the instruction code at Offset X and emulations 510X and 512X are scheduled for execution from Offset X for Platforms 3 and 5, respectively.

In one refinement of the method, only the initial emulation pass causes such passes to be enqueued, whereas those passes enqueued through this process cannot themselves generate additional passes. This has the intrinsic property of preventing a "fork bomb" like scenario, in which an attacker repeatedly invokes profile-dependent behavior in order to create an exponential explosion of detection tasks. Detection is still effective, since a discrete stage of malicious code may execute entirely upon one target even though it might, in fact, be compatible with multiple targets. Therefore, the malicious code is detected even without emulating multiple platforms simultaneously (i.e. without emulating a nonexistent machine which exhibits a randomly shifting architecture and operating system). This approach generally identifies a particular platform to meet the dependencies of malicious code that might exist in memory without unnecessarily duplicating computation.

In another alternative implementation, if malicious code is found during one pass of emulation from a particular offset, then the passes starting from the same offset, but with different profiles, will not be conducted. This has the small disadvantage that potentially more important malicious behavior might occur with one profile and be concealed by emergent or insignificant malicious behavior exhibited with another.

In general, the emulation pass on which malicious behavior occurs shares a profile with the payload target. However, in some implementations, in the event that multiple profiles yield differing malicious behavior, the target may be identified to be that with the most strongly indicated malicious behavior if a quantitative heuristic method of detecting malicious behavior is utilized to measure the severity of the behavior. In some implementations, the system will report all profile/offset pairs detected to produce malicious activity and identify the malicious behaviors detected on each.

Other data may be usable, in some examples, to assess the probability that this approach will yield a positive determination of mistargeted malicious code. For example, the reason the memory dump was collected or the indication by an external system of exploitation artifacts, such as heap spray or stack pivots, may be leveraged to determine the utility of the additional work created by this process. This information may be used either to adjust the priority of the cross-profile emulation jobs, or to decide whether to commit them at all. In the case of an external system indicating exploitation artifacts are present in memory, the system may commit the additional emulation jobs with a slightly lower priority (if prioritization is available) than those predicated upon the profile corresponding to the system from which the memory image was taken. The reason for dump collection may be more illuminating. For example, if the reason for memory image collection was that an invalid system call caused an exception, then the priority of cross-profile emulation tasks may be elevated since the likely scenario is that malicious code ran on a platform that did not meet its operating system dependency. Similar heuristics and mappings may exist and are externally configurable.

Some meta-heuristics may be of particular use in this scenario. For example, consider a hypothetical set of supported operating systems with differing system call numbers but otherwise similar behavior (e.g. Windows). An individual system call number may therefore be of interest on some architectures but not others. For example, a system call number may be unused on one operating system and a benign operation on another, but the same system call initiated in the same manner may be a fork operation (which in this case is flagged for reporting by the emulator) on one or more other operating systems. In this example, an additional pass may be generated only for the starting address of the pass from which the system call was encountered, and only for those operating systems on which it is a system call of interest. Data of this nature may be stored in stores 404 and 412 of FIG. 5 or 462 of FIG. 6.

The heuristic hits caused by modulating the operating system profile of the emulator may also be specially treated. In one example, all the heuristic hits contributing to a positive determination of malice or to an attacker profiling decision must be applicable to the same operating system profile, and heuristic hits are filtered or grouped according to this condition. Conversely, heuristic hits that are triggered on the basis of one or more operating system profiles are tagged with the identities of those profiles. Then, in some examples, the aggregate heuristic results may be evaluated once for each operating system profile that was involved in the production of the heuristic output, with only those heuristics applicable to that particular profile being considered in each such evaluation. The profile for which the strongest indication of malice is found is identified as the target of the exploitation, or, alternatively, those profiles for which a threshold for indication of malice is met, are collectively identified as the potential targets of the exploitation.

Generally, the multi-profile emulation approach will typically generate no more than $(p-1)n$ additional jobs, where p is the number of supported profiles, and n is the number of instructions found during all emulation passes of the original work that depend on profile lookups. Typically, this emulation approach will result in significantly fewer than $(p-1)n$ jobs being executed, since not all instructions are executable on all platforms and not all profile-dependent behavior differs across each platform.

Other embodiments, not exclusive of the abovementioned embodiments, may focus on microarchitectures rather than platforms. This approach is applicable both to non-privileged code and to privileged code, and in one additional embodiment considers privileged code and non-privileged code on one microarchitecture to be two different microarchitectures. Many microarchitectures are sufficiently dissimilar to each other that register state does not map cleanly between them, and that the behavior of all or nearly all instruction streams is typically completely dissimilar. Consequently, the approach of waiting for a profile dependency before branching is not useful in cases involving unrelated microarchitectures. Rather, it may be useful to plan an emulation pass in the same manner as that planned for the original pass, except predicated upon the different architecture. An example of such a microarchitecture pair is x86 and MIPS.

Moreover, since the nature of software exploitation itself tends to have strong architecture-level dependencies (due to items such as stack direction, alignment requirements, and pointer mechanics), a malicious payload is unlikely to be injected into memory space and then accidentally called if it is not compatible with the machine architecture on which it is to be run, but rather is compatible with a completely or nearly completely dissimilar one. A more likely scenario in this case is that some other stage meant to be executed on another component or coprocessor of the system generating the memory image exists in memory, e.g. a payload in user memory in an x86 process intended for use in exploiting the TPM (trusted platform module), or a payload inside a conventionally emulated virtual machine which was intended to be used in exploitation of the hypervisor.

Other variations to this approach are also possible. First, an intrinsic optimization exists in that running code on an architecture for which it is not designed has a proclivity to rapidly produce illegal instruction streams, rendering the cost of each such pass very low, or enabling the static pre-emption of such passes. Second, if malicious code is found in one pass, it is possible to abort the passes not corresponding to that profile and architecture, at the cost of potentially not identifying more than one stage where more than one incompatible stage exists in memory. If these two variations are combined, and the architectures used involve the concept of platform or operating system profiles, passes related to attempting a particular architecture may generate additional jobs related to attempting varying profiles on that architecture, but may not always generate jobs related to attempting any or all other architectures. Also, an architecture-related pass may begin with a specified default profile and allow profile explosion to attempt execution with different profiles as needed, rather than committing jobs for each profile on each architecture. In another refinement of this variation on the method, the profiles and architectures chosen are varied depending on the instant instruction, such that an invalid instruction will generate attempts on other architectures and superset profiles where more functionality is implemented, but a valid instruction with only operating system or platform dependent behavior will only generate additional passes for different operating systems or platforms on the same architecture.

It is also possible in some cases to determine the nature of the dependencies of the payload beyond profile matching. For example, consider the case whereby an instruction set architecture (or operating system represented by some profile) has multiple revisions and several optional features. Functionality dependent upon the implementation of optional features may be tagged in the emulator, and a list of exercised features in each pass may be compiled. This list of features represents the minimum requirements for the payload to run, and may be used to narrow the targets the payload may execute on, by, for example, applying subset matching against lists of the features or behaviors present in each implementation. In the event that the same payload is identified on multiple passes, the narrowest set of requirements expressed by any pass may be the minimum requirements provided that such a set is a subset of the other sets, or is the empty set. If no such set exists, additional sets may be chosen in order of increasing width such that all sets indicated are supersets or equivalent to those sets so chosen, and in this case the sets chosen represent alternative requirements.

Figure 8:
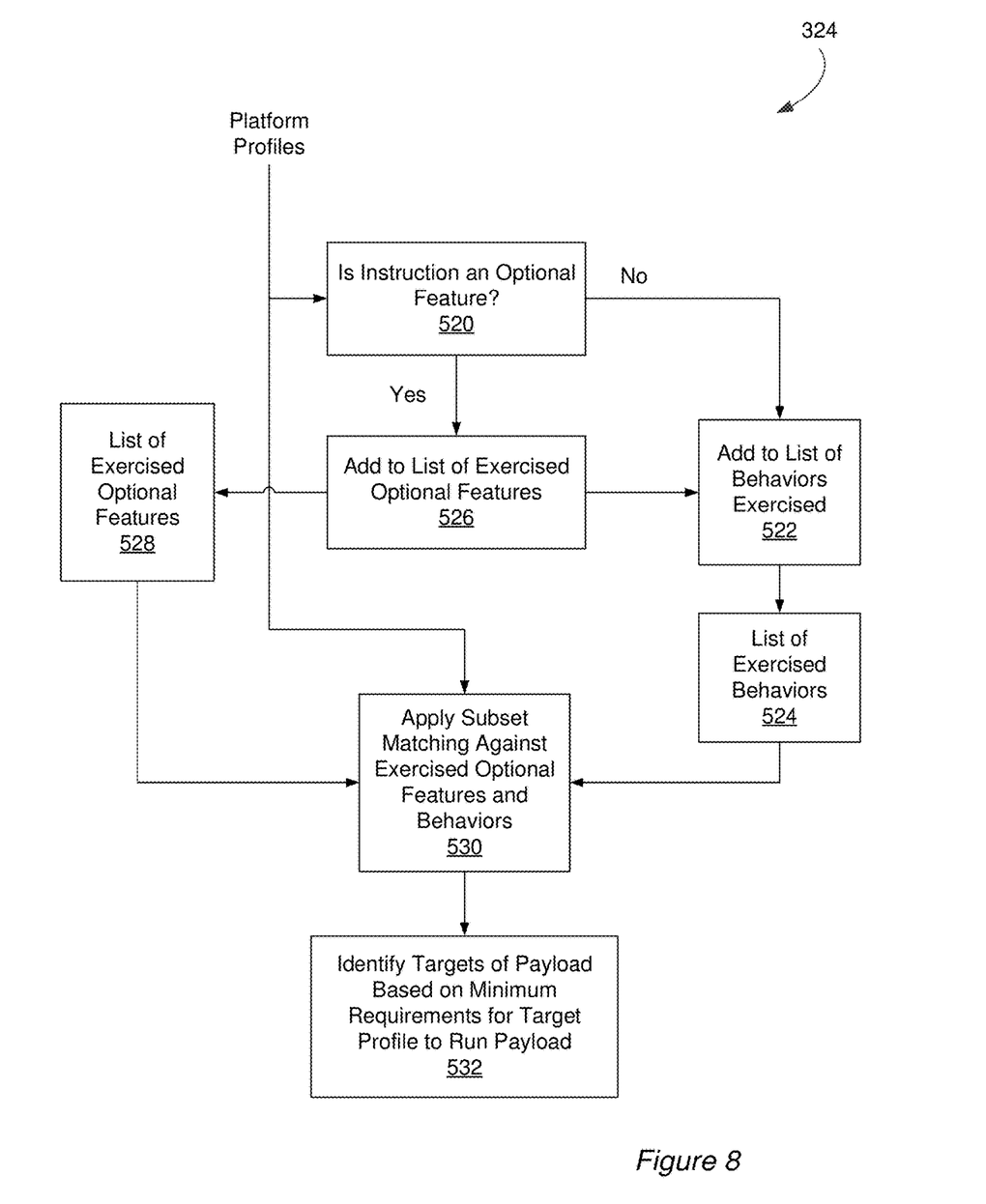
FIG. 8 is a control flow diagram illustrating one example of a function where the emulation approach is adapted to identify target platforms based on observed optional features and behaviors.

FIG. 8 is a control flow diagram illustrating one example of a function, such as function 324 in FIG. 4, wherein the emulation approach is adapted to generate lists of exercised optional features and behaviors for use in identifying target platforms. At step 520, the failed instruction is checked against, in this example, provided platform profiles to determine if the instruction relates to an optional feature for at least one platform. If not, then control branches to step 522 to add the observed instruction to the list of behaviors exercised in the emulation 524. If the instruction does relate to an optional feature, then the optional feature is identified in a list of exercised optional features for the payload 528. Function 530 applies subset matching of platform profiles to the list of exercised optional features and behaviors to identify platforms 532 as potential targets for the payload that are minimally capable of implementing, performing, or supporting the optional features and behaviors observed in emulation of the payload.

In accordance with at least one embodiment of the invention, the system, apparatus, methods, processes and/or operations described herein may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system. In accordance with another embodiment of the invention, the system, apparatus, methods, processes and/or operations described herein may be wholly or partially implemented in the form of a set of processor executable instructions stored on persistent storage media.

Figure 9:
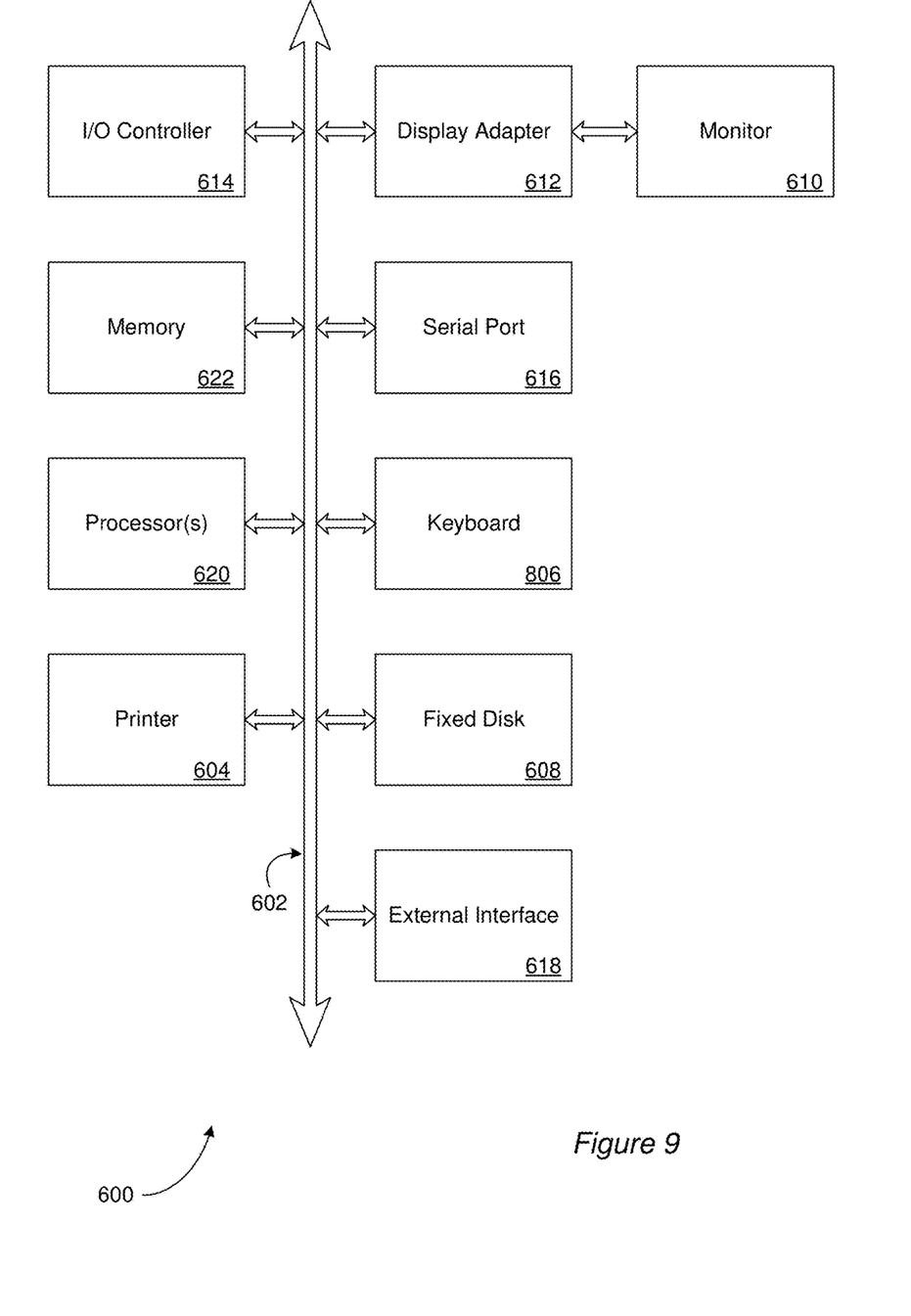
FIG. 9 depicts aspects of elements that may be present in a computer device and/or system configured to implement a method, system and/or process in accordance with some embodiments of the present invention.

FIG. 9 depicts aspects of elements that may be present in one example of a computer device and/or system 600 configured to implement at least some elements of a method, system and/or process in accordance with some embodiments of the present invention. The subsystems shown in FIG. 9 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 9 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components or steps depicted in the drawings or described above, as well as components and steps not shown or described, are possible without departing from the scope of the invention. Similarly, some features and subcombinations are useful and may be employed without reference to other features and subcombinations. Embodiments of the invention have been described for illustrative and not restrictive purposes, and alternative embodiments will be apparent to one of ordinary skill in the art. Accordingly, the present invention is not limited to the embodiments described above or depicted in the drawings, and various embodiments and modifications can be made without departing from the scope of the invention.

I claim:

1. A method for detecting potentially malicious code by iteratively emulating potentially malicious code, the method comprising the steps of:
for each offset of a memory image:
emulating execution of an instruction at the offset on a first platform;
if execution fails, determining whether the instruction at the offset has relevance to at least one second platform;
responsive to said determining, scheduling emulation of the instruction at the offset on the second platform;
if execution succeeds, checking the behavior of the executing code for suspect behavior; and
identifying the executing code as malicious code if suspect behavior is detected.

2. The method of claim 1, where said scheduling emulation of the instruction on the second platform includes only scheduling emulation of the instruction at the offset on the second platform for a first emulation iteration for the memory image.

3. The method of claim 1, where the suspect behavior includes one or more of invocations of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

4. The method of claim 3, where at least some of the suspect behavior is defined at least one of dynamically, parametrically, and statically.

5. The method of claim 1, the method including monitoring at least one of optional features, predicates and dependencies exercised during emulation and matching the exercised optional features, predicates and dependencies against a set of provided platform profiles to identify one or more potential target platforms from the set of provided platform profiles for a payload in the memory image.

6. The method of claim 1, where scheduling emulation of the instruction at the offset on the at least one second platform comprises scheduling at least one second emulation of the instruction on one or more second platforms based on similarity or dissimilarity of the first platform to the one or more second platforms.

7. The method of claim 6, where detection is primed by scheduling one emulation iteration on each dissimilar feature set from one or more supported system platform profiles or microarchitectures.

8. A persistent computer readable medium storing computer code configured to a cause a processing device to operate to automatically detect potentially malicious code by iteratively emulating potentially malicious code, the computer code including instructions that configure the processing device to:
for each offset of a memory image:
emulate execution of an instruction at the offset on a first platform;
if execution fails, determine whether the instruction at the offset has relevance to at least one second platform;
responsive to said determination, schedule emulation of the instruction at the offset on the second platform;
if execution succeeds, check the behavior of the executing code for suspect behavior; and
identify the executing code as malicious code if suspect behavior is detected.

9. The persistent computer readable medium of claim 8, where said schedule emulation of the instruction at the offset on the second platform includes only schedule emulation of the instruction at the offset on the second platform for a first emulation iteration for the memory image.

10. The persistent computer readable medium of claim 8, where the suspect behavior includes one or more of invocations of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

11. The persistent computer readable medium of claim 10, where at least some of the suspect behavior is defined at least one of dynamically, parametrically, and statically.

12. The persistent computer readable medium of claim 8, the instructions are further configured to monitor at least one of optional features, predicates and dependencies exercised during emulation and match the exercised optional features, predicates and dependencies against a set of provided platform profiles to identify one or more potential target platforms from the set of provided platform profiles for a payload in the memory image.

13. The persistent computer readable medium of claim 12, where detection is primed by scheduling one emulation iteration on each dissimilar feature set from one or more supported system platform profiles or microarchitectures.

14. A system for detecting potentially malicious code by iteratively emulating potentially malicious code, the system comprising:
    one or more processors; and
    at least one computer storage medium having computer executable instructions stored thereon which, when executed by the one or more processors, cause the one or more processors to perform a computer-implemented method comprising:
    for each offset of a memory image:
        emulating execution of an instruction at the offset on a first platform;
        if execution fails, determining whether the instruction at the offset has relevance to at least one second platform;
        responsive to said determining, scheduling emulation of the instruction at the offset on the second platform;
        if execution succeeds, checking the behavior of the executing code for suspect behavior; and
        identifying the executing code as malicious code if suspect behavior is detected.

15. The system of claim 14, where said scheduling emulation of the instruction on the second platform including only scheduling emulation of the instruction at the offset on the second platform for a first emulation iteration for the memory image.

16. The system of claim 14, where the suspect behavior includes one or more of invocations of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

17. The system of claim 16, where at least some of the suspect behavior is defined at least one of dynamically, parametrically, or statically.

18. The system of claim 14, where the results of emulation, coupled with heuristic hits tagged with the platform, architecture, or other circumstances and predicates or dependencies, further determines at least one potential target platform from a set of provided platforms that is targeted by a code segment identified as malicious.

19. The system of claim 14, where scheduling emulation of the instruction at the offset on the at least one second platform comprises scheduling at least one second emulation of the instruction on one or more second platforms based on similarity or dissimilarity of the first platform to the one or more second platforms.

* * * * *